United States Patent
Rögele et al.

(10) Patent No.: US 7,024,333 B2
(45) Date of Patent: Apr. 4, 2006

(54) COORDINATE MEASURING APPARATUS

(75) Inventors: Rudolf Rögele, Königsbronn (DE); Dieter Kalmbach, Hermaringen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 196 days.

(21) Appl. No.: 10/658,382

(22) Filed: Sep. 10, 2003

(65) Prior Publication Data

US 2005/0171728 A1    Aug. 4, 2005

Related U.S. Application Data

(63) Continuation of application No. PCT/EP02/02386, filed on Mar. 5, 2002.

(51) Int. Cl.
*G06F 15/00* (2006.01)

(52) U.S. Cl. .......................... 702/155; 702/94; 702/95; 702/150; 702/151; 702/152; 702/153; 702/33; 702/104; 702/116; 702/189; 700/189; 33/504; 33/505

(58) Field of Classification Search ............ 702/94–95, 702/150–153, 33, 104, 116, 189; 700/189; 33/504–505

See application file for complete search history.

(56) References Cited

U.S. PATENT DOCUMENTS 5,491,638 A    2/1996 Georgi et al.
6,587,810 B1 *   7/2003 Guth et al. ................. 702/168

OTHER PUBLICATIONS

"KMG automatisch programmieren—Generierung, Visualisierung und Modifizierung von Atastpunkten und Verfahrwegen", P. Wocke, F&M Feinwerktechnik & Messtechnik Carl Hanser Verlag München, vol. 102, No. 4, 1994, pp. 181 to 186.

* cited by examiner

Primary Examiner—John Barlow
Assistant Examiner—Sujoy Kundu
(74) Attorney, Agent, or Firm—Walter Ottesen

(57) ABSTRACT

A coordinate measuring apparatus includes probe pin(s) fixed to a probe head displaceable in coordinates. The probe pin includes probe shafts having respective ends to which probe balls are attached. At least two of the probe shafts are differently oriented when the probe pins are fixed to the probe head. A control and evaluation unit controls the course of measurement and evaluates the measuring points recorded. At least one probe shaft is determined for measuring a geometric element on a workpiece by determining at least one characteristic piece of directional information for the points to be measured of a geometric element to be measured on the workpiece, either on the basis of the measured measuring points or according to predefined nominal data of the geometric element. At least one probe shaft for measuring the measuring points is determined from the directional information.

22 Claims, 6 Drawing Sheets

COORDINATE MEASURING APPARATUS

RELATED APPLICATION

This application is a continuation application of international patent application number PCT/EP 02/02386, filed Mar. 5, 2002, and claiming priority from German patent application 101 11 540.7, filed Mar. 10, 2001.

FIELD OF THE INVENTION

The invention relates to a coordinate measuring apparatus for measuring workpieces. The apparatus has at least one probe pin which can be attached to a probe head moveable in the coordinate directions. The probe pin or the probe pins have shafts at whose respective ends contact bodies are attached and at least two of these shafts have different orientations when attached to the probe head in accordance with the application. The apparatus also includes a control and evaluation unit for controlling the measuring sequence and for evaluating the measuring points recorded.

BACKGROUND OF THE INVENTION

A method for controlling a coordinate measuring apparatus of the above kind is, for example, disclosed in U.S. Pat. No. 5,491,638. For scanning the workpiece including a plurality of geometric elements, there are a plurality of different probe pins available which can be attached so as to be exchangeable on the probe head of the coordinate measuring apparatus with the probe head being moveable in the coordinate directions. For this purpose, the probe pins are stored at the edge of the measuring region in a corresponding magazine. The probe pins have shafts of different orientations and contact bodies in the form of probe balls are attached to the ends of the probe shafts. Different probe shafts with their contact bodies attached thereto are used for measuring the different geometric elements of the workpiece.

The measuring sequence for measuring a geometric element can basically be generated in two different ways. The first possibility is the automatic generation of CAD data of the workpiece. For a geometric element to be contacted, the measuring points on the geometric element to be contacted are generated automatically from the CAD data of the workpiece. For example, to measure a planar surface of the workpiece, which is defined by the geometric element "plane", a two-dimensional measuring point raster could automatically be developed which defines the points on the plane to be contacted. Alternatively, the measuring points to be contacted can also be recorded by the operator of the coordinate measuring apparatus for the geometric element in a so-called teach-in method. For this purpose, the operator of the coordinate measuring apparatus contacts the desired points to be contacted on the particular geometric element of a workpiece via the coordinate measuring apparatus. The coordinate measuring apparatus is, in this case, controlled manually by the operator of the apparatus.

Common to both methods is, however, that the person who develops the measurement sequence must determine one or several suitable probe shafts with which the measuring points of the geometric element are to be scanned. This method is time intensive. Especially in measurement sequences wherein the operator of the coordinate measuring apparatus must record the measuring points to be scanned in a teach-in method, it occurs that, with the use of complex probe pins, the operator of the coordinate measuring apparatus inadvertently scans the measuring points to be contacted on the geometric element with another probe shaft than the one which is adjusted in the operating program of the coordinate measuring apparatus. This leads to the situation that completely incorrect measurement values are recorded. This has the consequence that all measuring points, which are measured up to now, must be recorded anew with the correct probe pin.

SUMMARY OF THE INVENTION

In view of the above, it is therefore an object of the invention to provide a coordinate measuring apparatus of the kind described above with which measuring sequences can be generated in a simple manner and can be carried out.

The coordinate measuring apparatus of the invention is for measuring a workpiece. The coordinate measuring apparatus defines coordinate directions (x, y, z) and includes: a probe head movable in the coordinate directions (x, y, z); a probe pin or probe pins which can be attached to the probe head; the probe pin or the probe pins having a plurality of shafts having respective ends; a plurality of contact bodies attached to corresponding ones of the ends of the shafts; at least two of the shafts of one of the probe pins having different orientations when the probe pin is attached to the probe head; a control and evaluation unit for controlling the measuring sequence and for evaluating the recorded measuring points; the control and evaluation unit functioning to carry out a method including the steps of: determining at least one characteristic direction data ($\vec{n}_i$) for the points, which are to be measured, of a geometric element on the workpiece either from measured measuring points ($P_1$ to $P_4$) or from predefined desired data of the geometric element; and, determining one or several probe shafts of the one or several of the measuring points of the geometric element which are suitable from the directional data ($\vec{n}_i$).

According to a feature of the invention, at least one characteristic direction information for the measuring points to be measured of a geometric element to be measured on the workpiece is determined either from measured measuring points or from predefined desired data of the geometric element. From this, one or several probe shafts are determined which are suitable for the measurement of the measuring points of the geometric element.

The basic idea of the invention is that the determination of one or several suitable probe shafts for scanning the measuring points of a geometric element is derived from one or several direction data of the geometric element. In this way, there results the considerable advantage compared to the known method that, in an automated method, a suitable probe shaft can be determined and this data must no longer be determined and inputted by the developer of the measuring sequence.

The probe shafts, which are determined as suitable, can be suitably suggested for measuring the particular geometric element.

The direction information can either be derived from the CAD data of the workpiece or even from scanned measuring points of the geometric element to be measured.

At this point, the term "geometric element" is defined. A geometric element is a mathematical substitute element which can be scanned on a workpiece to be measured. A suitable geometric element for a bore is, for example, the cylinder. An enumeration of geometric elements includes, inter alia: the point, the plane, the freeform surface, a circle, a cylinder, a cone, an ellipse, a sphere and a torus.

A plurality of quantities known from mathematics can be used as direction data. For example, a planar equation can be used for the geometric element "plane". With the planar equation, the orientation of the plane is clearly defined. As directional data, one would advantageously, however, use vectors because an especially simple computation is possible. The determination of suitable probe shafts can therefore take place very simply in that the directional data of the geometric element (for example, the vector) and the longitudinal direction of the probe shaft conjointly define an angle.

As directional data in outer elements, the surface normals of the geometric element at the measuring points to be scanned are suitable, that is, the vectors which stand perpendicularly on the surface of the geometric element at the measuring points to be scanned. These outer elements include, for example, a plane which can be scanned from the outside, a cylinder scannable from the outside or a sphere. The term "outer element" means that the particular geometric element can be measured from the outside and is easily accessible without having to penetrate with the probe pin into a bore, recess or cutout of the workpiece. Each individual measuring point can advantageously be assigned a suitable vector. Then, for each measuring point individually, a suitable probe shaft is suggested. This is especially purposeful when a geometric element cannot be measured with a single probe shaft. Alternatively, only an individual vector is sufficient for the total geometric element when it is clear that the total geometric element can be measured with only one probe shaft. If, for example, only a small sphere segment of a sphere is to be measured, then, for example, it is sufficient to provide the surface normal in the zenith of the sphere segment to be measured. In a plane, it is sufficient to determine the surface normal at any desired position on the plane. From this, it becomes especially clear that the surface normal must not perforce be coincident with a point, which is to be measured, on the surface of the workpiece.

For internal elements such as a cylinder, which is to be scanned in a bore, the vector in the direction of the primary axis of the geometric element serves as direction data. The term "inner element" means that the particular geometric element can only be measured when the probe pin is plunged into a bore, recess or cutout of the workpiece.

An especially suitable probe shaft should be so selected that the shaft direction is aligned as parallel as possible to the surface normal for outer elements and to the vector along the main axis for inner elements. This can take place relatively simply in that the angle between the longitudinal axis of the probe shaft and the vector of the geometric element is computed. In this way, there is, however, still the problem that, additionally, it must be known at which end of the probe shaft the contact element is. The contact element, for example, is the probe ball. It is now considerably simpler to assign a vector to the probe shaft whose longitudinal direction indicates the orientation of the probe shaft and whose direction indicates at which end of the probe shaft the contact element sits. In dependence upon the direction selection of the vector of the geometric element and of the vector of the probe shaft, there results an angle of 0° or 180° between the vectors.

Only in a few cases can this condition for the measuring points of a geometric element to be scanned be satisfied. For example, for a sphere to be measured, there is only a single measuring point in which the surface normal has the pregiven angle to the vector of the probe shaft. Preferably, an angular range should be given within which the angles between the directional data of the geometric element and the probe should lie. When using the above-mentioned example, there results an angle of $180°\pm\epsilon$ or $0°\pm\epsilon$ between the vector of the geometric element and the vector of the probe shaft. Here, $\epsilon$ should be a maximum of 90°.

Because of the relatively large angular range, there are several probe shafts which are found to be suitable. In this case, that particular probe shaft is preferably selected which comes closest to the optimal angle of 0° or 180°. Furthermore, in exceptional situations for measuring a geometric element, several probe shafts can be needed as is, for example, necessary when a large part of a sphere is to be measured. For this case, the probe shafts are so selected in dependence upon the direction vectors of the geometric element that the least possible number of probe shafts is needed for measuring the geometric element.

As already explained, it can be necessary for the development or completion of the measuring sequence that the operator of the coordinate measuring apparatus has to scan the measuring points to be sampled on a sample workpiece with the coordinate measuring apparatus in a teach-in procedure. Here, with complex probe pins, it can occur that the operator of the coordinate measuring apparatus selects another probe shaft in the operating program of the coordinate measuring apparatus than would be determined as suitable by the program for the later recordation of the measuring points. In conventional coordinate measuring apparatus, this has the consequence that all recorded measuring points must again be detected ab initio. According to an advantageous embodiment of the invention in the scanning of the geometric element with a non-suggested probe shaft, the control and evaluation unit can convert the measuring points sampled with the non-suggested probe shaft to the suggested probe shaft. This is relatively easy because for each contact body, calibration data are stored in the control and evaluation unit which define the offset of a defined point of the particular contact body relative to the machine coordinate system as well as its geometry. For a probe ball as contact body, the offset of the center point of the probe ball relative to the machine coordinate system is stored as is the radius of the probe ball. These calibration data are determined for each contact body individually in a calibration procedure.

In this way, a conversion of the measuring points sampled with a first contact body to a second contact body is possible without difficulty via vector arithmetic.

BRIEF DESCRIPTION OF THE DRAWINGS

The invention will now be described with reference to the drawings wherein.

DESCRIPTION OF THE PREFERRED EMBODIMENTS OF THE INVENTION

Figure 3:
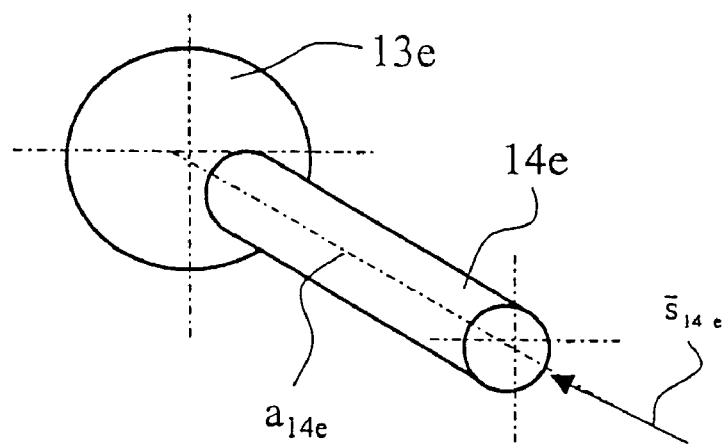
FIG. 3 is a perspective view of an individual probe shaft of the probe of FIG. 2.

FIG. 3. shows a coordinate measuring apparatus of the so-called portal type according to the invention. The coordinate measuring apparatus includes a probe pin 6 which is attached to a probe head 5 so that it can be exchanged. The probe pin 6 can be deflected in the three coordinate directions (x, y, z) relative to the probe head 5. The deflection of the probe pin 6 in the three coordinate directions (x, y, z) is detected by three measuring sensors disposed in the probe head 5. The probe head, in turn, can be moved in the three coordinate directions (x, y, z). For this purpose, the portal mechanism includes a portal 2 which can be moved on guides in the direction indicated by the arrow (y) relative to the measuring table 1. The so-called X-carriage 3 is, in turn, moved in the direction indicated by the arrow (x) along the traverse of the portal 2 spanning the measuring table. The spindle 4 is movably guided in the direction (z) on the X-carriage 3 so that the probe head 5 can be moved via the portal mechanism in the three coordinate directions (x, y, z). The measurement of a workpiece takes place in that the probe pin 6 contact scans or samples the workpiece 7, which is to be measured, at the provided measuring points. In the probe head 5, the deflection of the probe pin 6 relative to the probe head 5 is measured in the three coordinate directions (x, y, z). In addition, the actual or current position of the probe head 5 is measured in the three coordinate directions (x, y, z) on the three incremental scales (8a to 8c) which are scanned by optical read-out heads. For determining a measuring point, the scale measurement values (8a to 8c) are computed with the probe pin deflections, which are determined by the measuring sensors in the probe head 5, and a measuring point is generated therefrom.

In order to be able to measure complex workpieces having a complex geometry, different probe pins are usually needed which are held in the magazine 11 and are automatically exchanged in the probe head 5 via an exchange unit. Of course, a single probe pin having several different probe shafts would be sufficient which probe pin is non-exchangeably mounted on the probe head 5, for example, by means of a threaded fastener. The different probe pins usually have one or several probe shafts and contact bodies (such as a probe ball or a cylinder) are attached to respective ends. For example, one could measure a horizontal bore, for example, only with a horizontally oriented probe shaft; whereas, a vertical bore can be measured only with a vertically oriented probe shaft.

In addition, the coordinate measuring apparatus includes drives by which the portal 2, the X-carriage 3 and the spindle 4 can be moved in the three coordinate directions (x, y, z). The control of the measuring sequence and the drives of the coordinate measuring apparatus as well as the recordation and evaluation of the measurement points determined herewith take place in the control and evaluation unit 9 which is, in this embodiment, realized by a single computer by way of example. The control and evaluation unit 9 is connected to a control console 26 with which the coordinate measuring apparatus can be moved manually in the coordinate directions (x, y, z) via operator-controlled levers. Other functions, for example, a probe pin exchange or a control of the measuring program can also take place via the control console 26.

Figure 1:
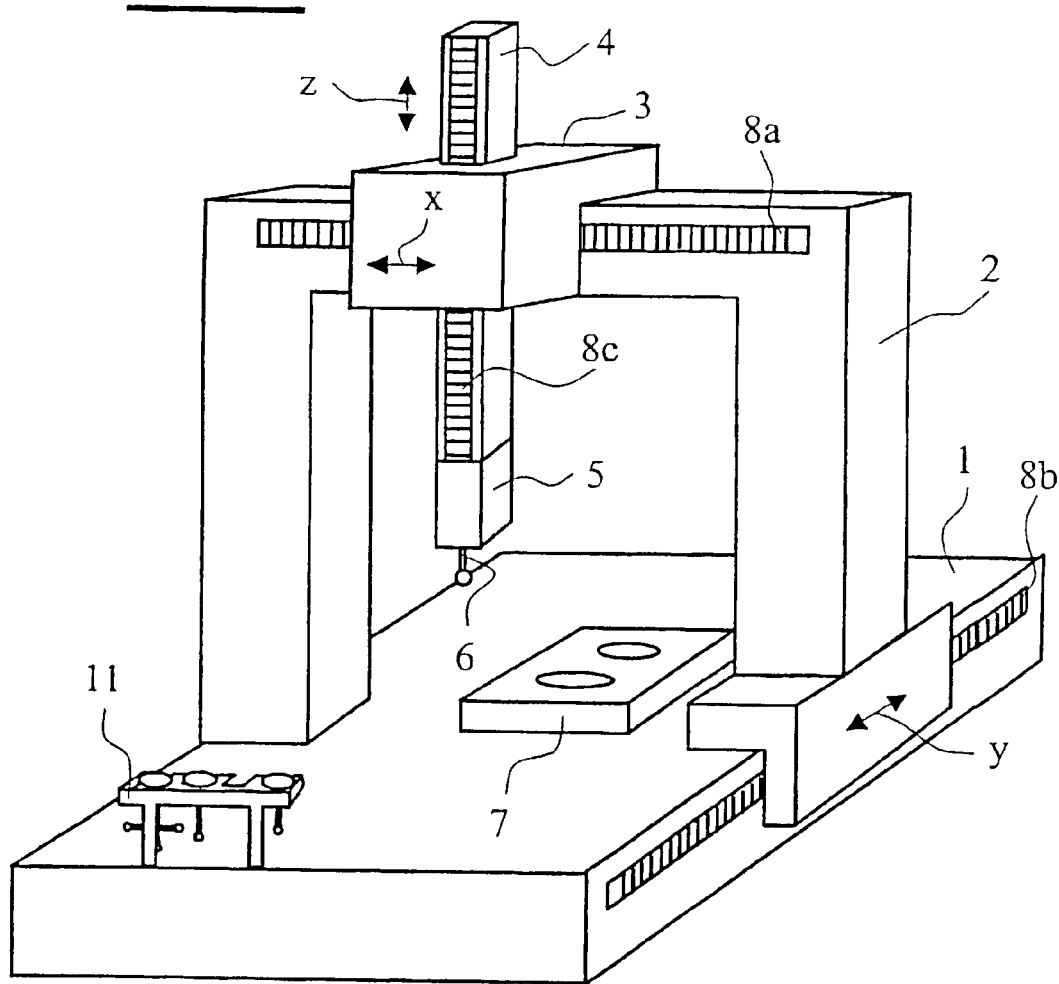
FIG. 1 is a schematic of the coordinate measuring apparatus of the invention.
Figure 1:
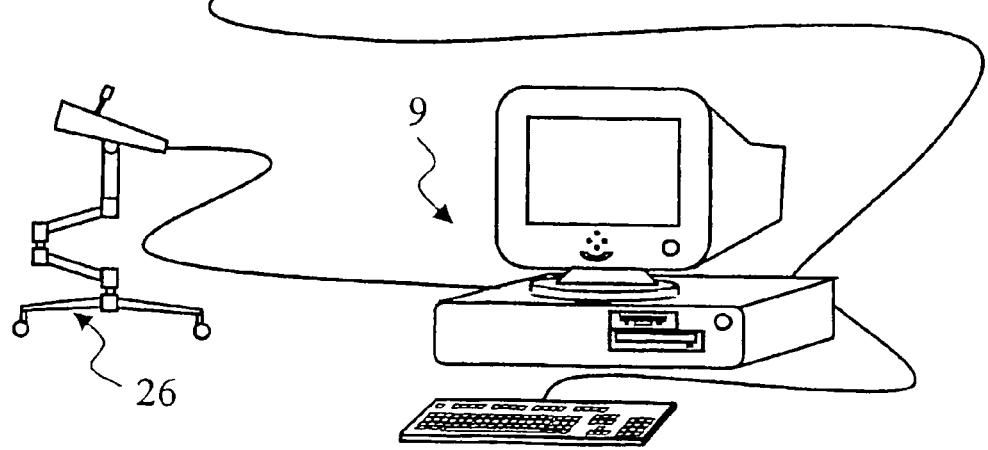
Figure 2:
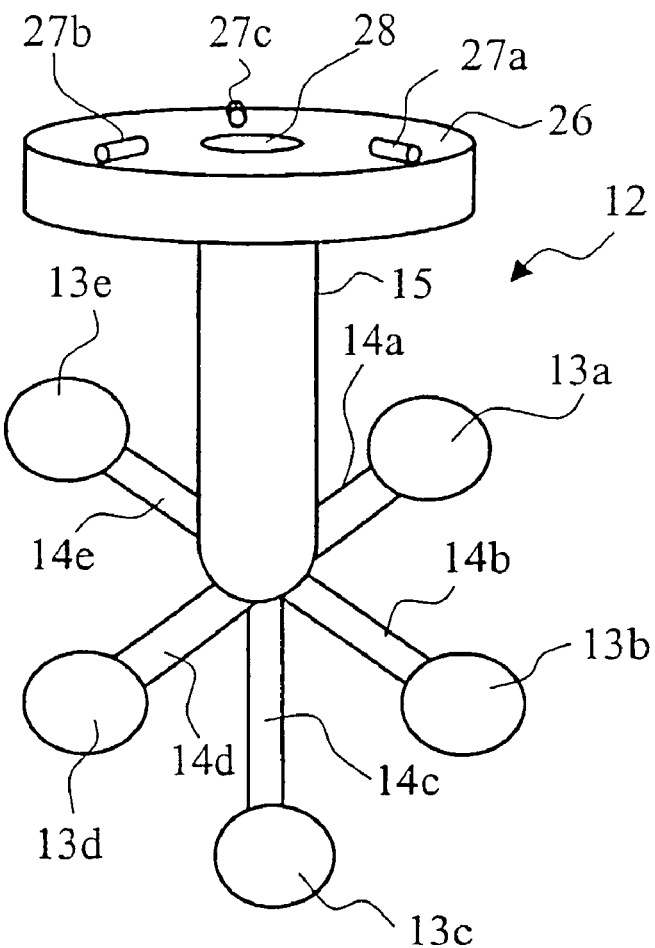
FIG. 2 shows a probe pin having five probe shafts of different orientation.

FIG. 2 shows an exemplary probe pin 12 as it could be present, for example, in the magazine 11 of the coordinate measuring apparatus of FIG. 1. The probe pin 12 has a probe pin plate 26 on which three cylinders (27a, 27b, 27c) are so distributed that their longitudinal axes are at angles of 120° to each other. A ferromagnetic component 28 is disposed in the center of the probe pin plate 26. For picking up the probe pin 12 from the magazine 11 of FIG. 1 and for attaching the same to the probe head 5, the ferromagnetic component 28 is pulled magnetically against the probe head by a corresponding electromagnetic unit in the probe head 5. The three cylinders (27a, 27b, 27c) come to rest on correspondingly assigned balls arranged in pairs on the probe head 5 so that, in this way, a three point support arises by which the support of the probe pin 12 on the probe head 5 is statically clearly determined.

Furthermore, the probe pin 12 has a central shaft 15 attached to the probe pin plate 26 and five probe shafts (14a to 14e) are attached to the lower end of the central shaft. The probe shafts (14a to 14e) are oriented in different directions. At the ends of the probe shafts (14a to 14e), respective scanning or contact bodies in the form of probe balls (13a to 13e) are attached which function for contact scanning or sampling the workpiece 7.

FIG. 3 shows a schematic of the probe shaft 14e and the probe ball 13e of the probe pin 12 of FIG. 2 attached thereto. Furthermore, a longitudinal axis $a_{14e}$ is assigned to the probe shaft 14e which, by way of example, runs through the center point of the probe ball 13e and through the center point of the profile of the probe shaft. Also shown in FIG. 3 is that a vector $\vec{s}_{14e}$ is assigned to the probe shaft 14e and this vector is aligned in the direction of the longitudinal axis $a_{14e}$. The foot point of the vector $\vec{s}_{14e}$ is directed in the direction of the suspension of the probe shaft 14e on the probe pin and its tip is in the direction of the contact body 13e. The vector $\vec{s}_{14e}$ could also be defined rotated by 180° in case this is wanted. In this case, the foot point of the vector $\vec{s}_{14e}$ is in the direction of the contact body 13e while the tip of the vector is pointed in the direction of the suspension of the probe shaft 14e.

It will now be shown with respect to FIGS. 4 to 8 how one of the five probe shafts (14a to 14e) for measuring a geometric element is selected in accordance with the invention. The five probe shafts (14a to 14e) are shown in FIG. 2.

Figure 4:
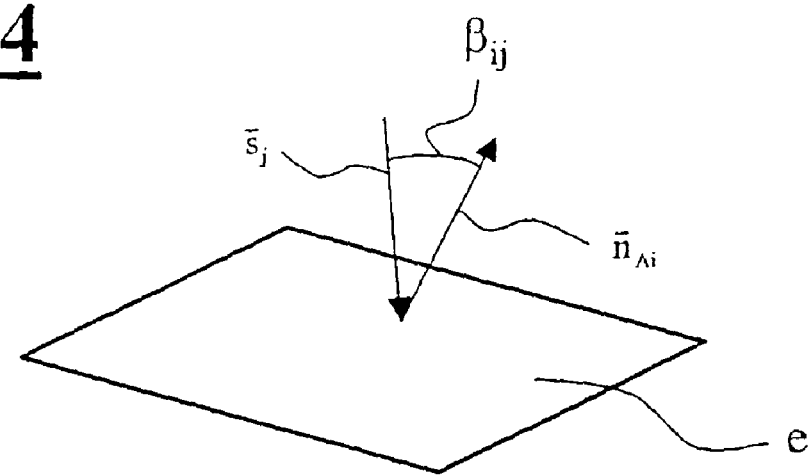
FIG. 4 is a schematic showing a probe shaft selection for an outer element (e)

FIG. 4 shows as a geometric element to be sampled or contact scanned a plane (e) which is configured as an outer element. The term outer element means that the particular geometric element can be easily accessed from the outside for measurement without it being necessary to go with the probe pin into a bore, recess or cutout of the workpiece. As shown here, the surface normal $\vec{n}_{Ai}$ is assigned to the plane (e) as direction information. The surface normal ($\vec{n}_{Ai}$) embodies a vector which stands perpendicular on the particular geometric element at a measuring point which is to be contact scanned or sampled. The vector $\vec{n}_{Ai}$ need not face away from the workpiece as shown in FIG. 4. Rather, the vector $\vec{n}_{Ai}$ can also just as well point in the direction of the workpiece. An angle $\beta_{ij}$ is formed between each of the vectors $\vec{s}_j$ of the different probe shafts (14a to 14e) of the probe pin 12 of FIG. 2 and the surface normal $\vec{n}_{Ai}$. The two vectors ($\vec{s}_j$ and $\vec{n}_{Ai}$) conjointly define the angle $\beta_{ij}$. As already explained, one of the probe shafts present is suggested as suitable when the surface normal $\vec{n}_{Ai}$ and the vector $\vec{s}_j$ of a probe shaft are as parallel as possible and the scan contact element is attached to the correct end of the probe shaft. Referred here to the system shown, this is the case when the vector $\vec{n}_{Ai}$ of the geometric element and the vector $\vec{s}_j$ of the probe shaft conjointly define an angle of 180°. In the case of a horizontal plane, this means for the probe shown in FIG. 2 that the probe shaft 14c with the contact body 13c would be selected. It is here noted that the indexes "i" are representative for the identification of geometric elements. The indices "j" are used representative for the identification of probe shafts which are used and available. The index "A" represents in the vector "$\vec{n}$" an outer element and the index "I" stands for an inner element.

Figure 5:
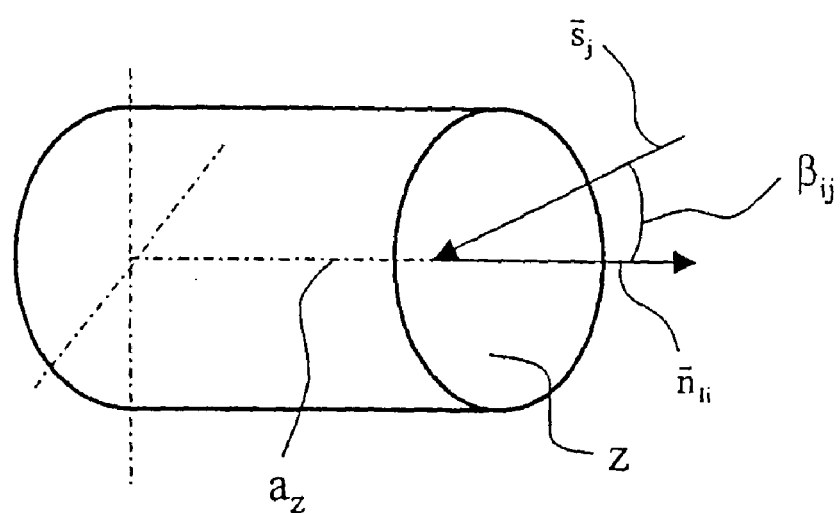
FIG. 5 shows a probe shaft selection for an inner element (z)

For an inner element, that is, a geometric element wherein the probe shaft must be moved into a cutout or recess for sampling, the determination of a suitable probe shaft takes place similarly. As an example of a geometric element to be measured, a cylinder (z) is shown in FIG. 5 as it could be present, for example, in a bore in a workpiece. In contrast to the outer element, a vector in the direction of the primary axis $a_z$ is used as the directional vector $\vec{n}_{Ii}$. As shown in FIG. 5, the vector $\vec{s}_j$ of each probe shaft has a defined angle $\beta_{ij}$ with the vector $\vec{n}_{Ii}$ of the geometric element (z) which in the ideal case is 180° exactly as in the case of an outer element.

The angle $\beta_{ij}$ between the vectors ($\vec{n}_{Ai}$ or $\vec{n}_{Ii}$) of a geometric element and the vector $\vec{s}_j$ of a probe shaft can be computed very simply via vector multiplication. The computation of a suitable probe shaft for outer elements as well as also for inner elements takes place in the same way. For this reason, the terminus $\vec{n}_i$ is used for simplification for $\vec{n}_{Ai}$ as well as for $\vec{n}_{Ii}$. If one determines a unit vector (that is, $|\vec{s}_j|=1$ and $|\vec{n}_i|=1$ from the vector $\vec{n}_i$ of a geometric element as well as from the vector $\vec{s}_j$ of the probe shaft, then the following relationship applies:

$$\vec{s}_j \vec{n}_i = |\vec{s}_j||\vec{n}_i|\cos(\beta_{ij}) \qquad \text{Equation 1}$$

In the ideal case, $\cos(\beta_{ij})=-1$ when the angle between the vector $\vec{n}_i$ of the geometric element and the vector $\vec{s}_j$ of the probe shaft is 180°. As already explained above, this condition is often not satisfied. However, in order to obtain a suitable probe shaft with great reliability for a plurality of different geometric elements, a region ($\epsilon$) about the angle ($\beta$) should therefore be determined within which the angle between the vector $\vec{n}_i$ of the geometric element and the vector $\vec{s}_j$ of the probe shaft can vary. The following must then apply:

$$\cos(\beta_{ij})<\cos(180°\pm\epsilon) \qquad \text{Equation 2}$$

The region ($\epsilon$) should be fixed individually for each geometric element. The considerations which are needed in each case will be explained now with respect to FIGS. 6 to 8.

Figure 6:
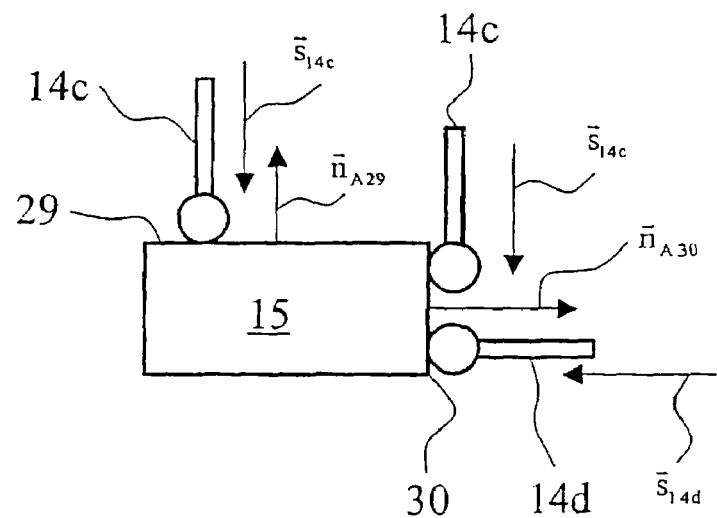
FIG. 6 shows a probe shaft selection of a probe shaft for the geometric elements of a workpiece.

FIG. 6 shows a rectangularly-shaped workpiece 15 having two planes (29, 30) to be measured as geometric elements. Since this is an outer element, the surface normals $\vec{n}_{A29}$ and $\vec{n}_{A30}$ can be used as vectors of the geometric elements. For selecting the horizontal upper surface 29 of the workpiece 15, the surface normal $\vec{n}_{A29}$ is here compared to the vectors $\vec{s}_j$ of the probe shafts (14a to 14e) of FIG. 2. For the shaft 14c of the probe 12 of FIG. 2, the condition applies exactly that the vector $\vec{n}_{A29}$ of the geometric element 29 and the vector $\vec{s}_{14c}$ of the probe shaft 14c conjointly define an angle of 180° so that the probe shaft 14c is selected as suitable and is suggested. For the vertical side surface of workpiece 15, whose geometric element "plane" is identified by the reference numeral 30, the procedure is exactly the same. Based on the above considerations, namely that the surface normal $\vec{n}_{A30}$ defines an angle of 180° with the vector $\vec{s}_{14d}$, the probe shaft 14d would be selected for the probe 12 of FIG. 2.

If one assumes the case that the probe 12 of FIG. 2 would have no probe shaft 14d and no probe pin of the magazine 11 of FIG. 1 would have a probe shaft with a horizontal orientation, it would still be possible to make a measurement of the particular geometric element 30 with the probe shaft 14c as shown schematically in FIG. 6. For this case, the vector $\vec{s}_{14c}$ of the probe shaft 14c and the vector $\vec{n}_{A30}$ of the particular geometric element 30 conjointly define an angle of 90°. If one permits a maximum of 90° for the geometric element "plane" as region ($\epsilon$), then the following inequality would result for the above-mentioned equation 2:

$$\cos(\beta_{ij})<0 \qquad \text{Equation 3}$$

Figure 7:
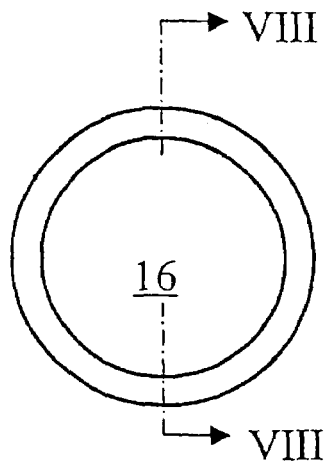
FIG. 7 shows a front elevation view of a workpiece with an outer element to be sampled and an interior element to be sampled.
Figure 8:
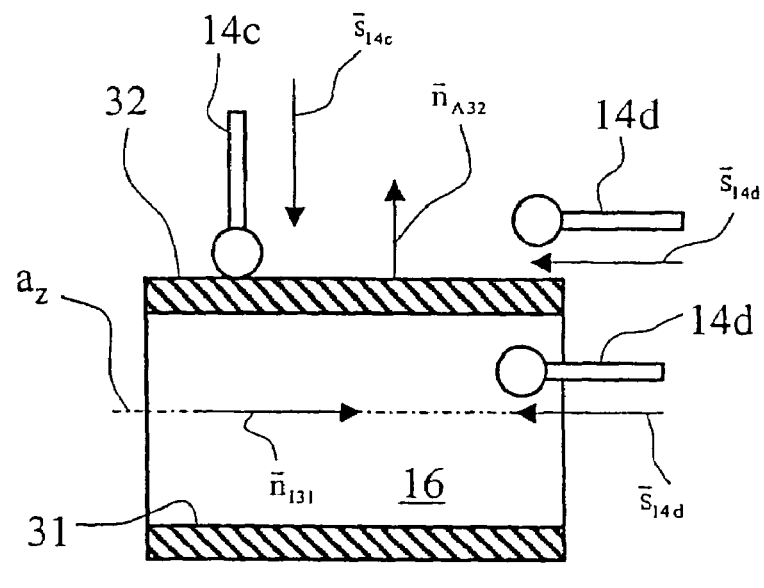
FIG. 8 shows a probe shaft selection for an outer element and an inner element of the workpiece of FIG. 7.

FIGS. 7 and 8 show the same considerations for another workpiece 16 which has a cylinder, which is to be scanned, as an outer element as well as a cylinder, which is to be scanned, as an inner element. A front elevation view of the workpiece 16 is shown in FIG. 7. FIG. 8 shows a section of the workpiece 16 of FIG. 7 along the line VIII—VIII. For the outer element of the cylinder, the surface normals in the measuring points to be sampled function as vector $\vec{n}_{A32}$ of the particular geometric element. For the uppermost measuring point on the cylinder 16, this is the normal vector $\vec{n}_{A32}$ aligned to the vertical. In accordance with the above condition, the probe shaft 14c would be selected as suitable in a comparison of vectors $\vec{s}_j$ of the possible probe shafts because the vector $\vec{s}_{14c}$ of the probe shaft 14c is at an angle of 180° with the vector $\vec{n}_{A32}$ of the geometric element 32. Alternatively, in accordance with the above considerations, the probe shaft 14d could also be used so that the region ($\epsilon$) could be fixed to ±90°. This is otherwise for the inner element of the cylinder. Vector $\vec{n}_{I31}$ of the particular geometric element 31 runs in the direction of the primary axis of the cylinder as already explained above. In the selection in accordance with the above principal, the probe shaft 14d would be selected because its vector $\vec{s}_{14d}$ and the vector $\vec{n}_{I31}$ of the geometric element 31 "cylinder" conjointly define an angle of 180°. If one would permit as region ($\epsilon$) a maximum of 90° as in the above example, then this would have the consequence that, if necessary, the probe shaft 14c would be selected. In this case, there would perforce be a collision between the workpiece 16 and the probe shaft 14c since the probe shaft could not be introduced into the bore of the workpiece 16. The region ($\epsilon$) must therefore be selected very small (for example, 5°) for cylindrical inner elements.

Figure 9:
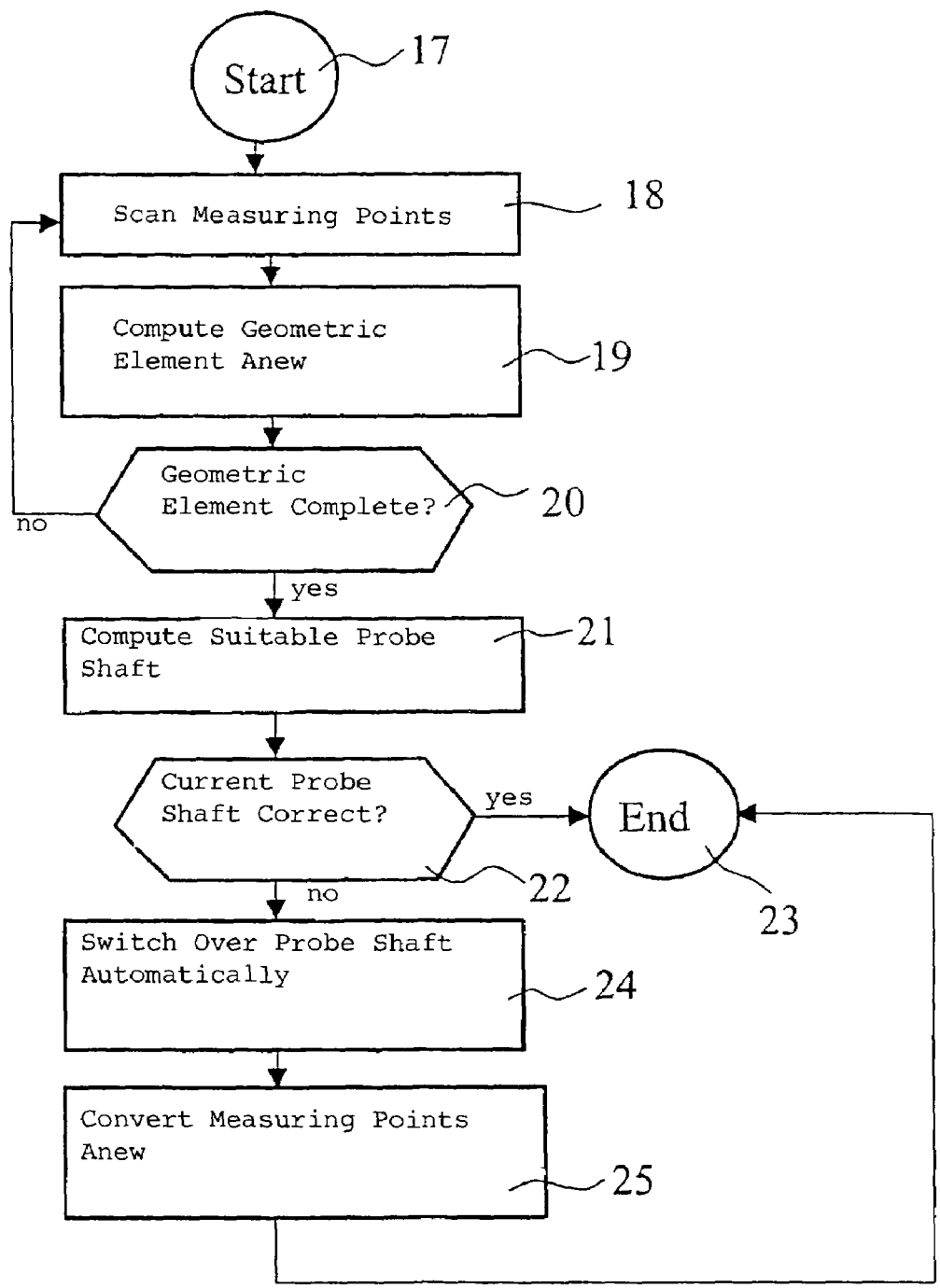
FIG. 9 shows a method for recording the measuring points of a geometric element to be sampled in a teach-in method and subsequent conversion of measuring points which were measured with a non-suggested probe shaft to the suitable probe shaft.

As explained above, the specific measuring sequence to a geometric element, inter alia, is defined in that the coordinate measuring apparatus, manually controlled, samples the particular geometric element on the workpiece. This operation is shown schematically in FIG. 9. In step 17, the method for recording measuring points, which are to be sampled on a geometric element, is started. The geometric element can, for example, be an inner cylinder of a bore. In step 18, individual measuring points, which are to be sampled, are recorded on the geometric element. In step 19, the measuring program automatically undertakes the adaptation of the predefined geometric element from the recorded sample points. According to step 20, the steps 18 and 19 are repeated until all measuring points of the geometric element are complete.

Figure 10:
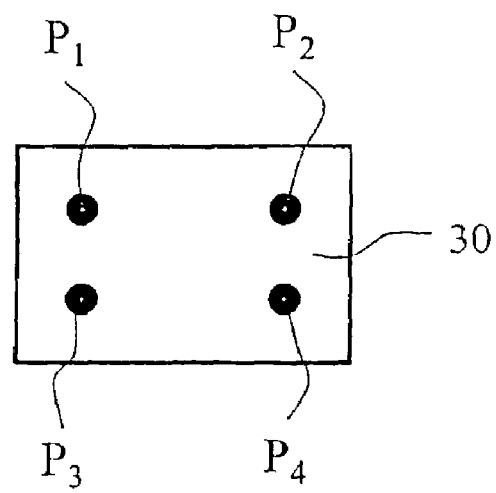
FIG. 10 shows the recordation of measuring points ($P_1$ to $P_4$) in a teach-in method on a geometric element "plane" of the workpiece of FIG. 6; and, FIG. 11 shows the conversion of the measuring points ($P_1$ to $P_4$), which are measured with the incorrect probe shaft 14c of FIG. 6, to a suitable probe shaft 14d.

This is shown by way of example in FIG. 10. Here, the geometric element 30 "plane" of the workpiece 15 of FIG. 6 is scanned in correspondence to the steps 18 to 20 of FIG. 9 by the coordinate measuring apparatus. Four measuring points ($P_1$ to $P_4$) are recorded by way of example and a plane is adapted via the four recorded measuring points ($P_1$ to $P_4$) in accordance with the Gaussian method of least squares.

After all measuring points ($P_1$ to $P_4$) are recorded, a suitable probe shaft for the particular geometric element is determined in step 21 in accordance with the above procedure. As already explained with respect to FIG. 6 in this connection, the control and evaluation unit 9 would determine the probe shaft 14c as especially suitable. In step 22, the control and evaluation unit 9 checks whether the currently used probe shaft, with which the measuring points were recorded in step 18, corresponds to the suitable probe shaft. If this is not the case, for example, because the operator of the coordinate measuring apparatus had used the probe shaft 14c for recording the measuring points ($P_1$ to $P_4$), then this would have meant in the conventional measuring programs that the operator of the coordinate measuring apparatus would have to record all previously recorded measuring points ($P_1$ to $P_4$) anew and would have to execute anew all of the method steps previously run through with the suggested probe shaft 14d. In this especially advantageous embodiment, however, the probe would be switched over to the correct probe shaft in step 24 and the sampled measuring points would be converted to the correct probe shaft in step 25.

Figure 11:
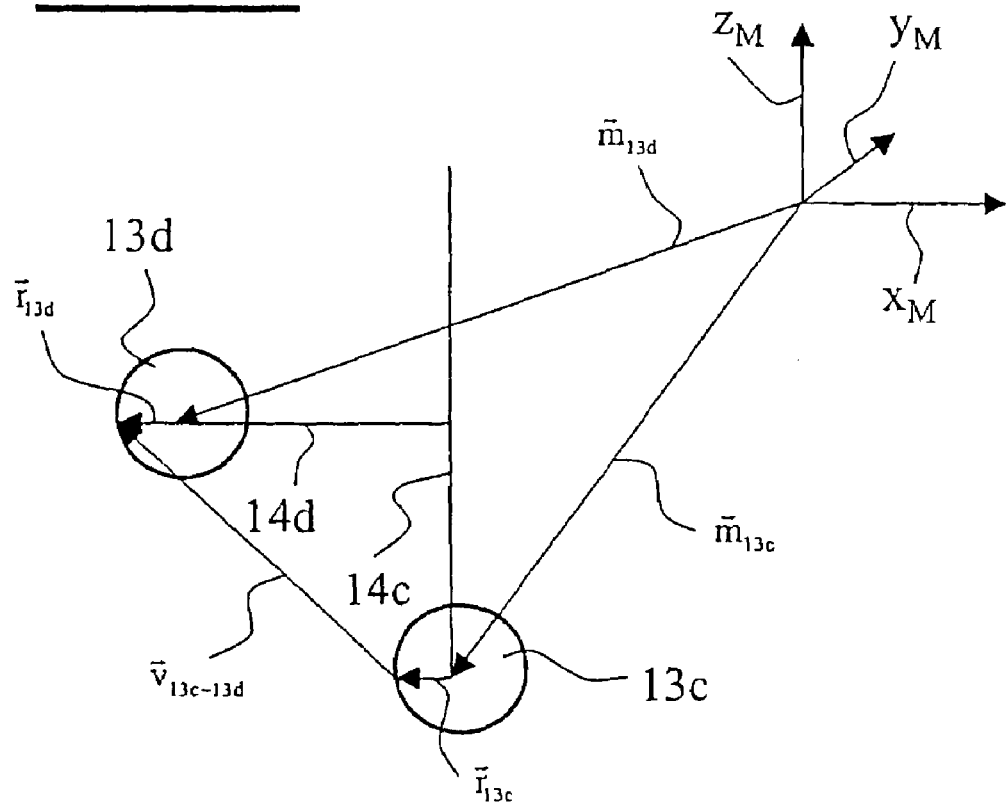

How this is done will be explained by way of example with respect to FIG. 11.

As already explained above, the exact offset of the center point of each contact body (13a to 13e) relative to a central machine coordinate system and the geometric data of the contact body (for a probe ball, the probe ball radius) are available as stored data. These data are determined in a calibration procedure as usual in coordinate measuring apparatus. Referred to the example described in connection with FIGS. 9 and 10, and as shown by way of example in FIG. 11, a vector $\vec{m}_{13c}$ is known which gives the offset of the center point of the contact body 13c relative to the machine coordinate system ($x_M$, $y_M$, $z_M$) as well as a vector $\vec{m}_{13d}$ which gives the offset of the center point of the contact body 13d relative to the machine coordinate system ($x_M$, $y_M$, $z_M$). Furthermore, the radii of the probe balls (13c, 13d) are known. From this, and together with the surface normals in the or at the measuring points ($P_1$ to $P_4$), corresponding vectors $\vec{r}_{13c}$ and $\vec{r}_{13d}$ are determined which point from the center points of the contact bodies (13c, 13d) to the points of the surface of the contact bodies (13c, 13d) in which these vectors contact the workpiece surface. The vectors $\vec{r}_{13c}$ and $\vec{r}_{13d}$ must perforce be parallel to each other. Via a simple vector arithmetic, a displacement vector $\vec{v}_{13c\text{-}13d}$ can be computed by which all measuring points ($P_1$ to $P_4$) must be displaced in order to convert to the suggested probe shaft 14d.

The measuring points recorded with a first probe shaft can therefore be converted via a simple vector arithmetic to the suggested probe shaft. In this way, the operator of the coordinate measuring apparatus can now begin with the recordation of measuring points of a new geometric element in accordance with step 17 (see FIG. 9).

It is also mentioned that the invention is not limited to the embodiments of FIGS. 1 to 11. Rather, numerous changes can be made. For example, the coordinate measuring apparatus need not be a portable measuring apparatus as shown in FIG. 1. Instead, a stand measuring device, bridge measuring device or a robot arm having rotational joints can be used for moving the probe head 5 in the coordinate directions. Also, the probe elements 13a through 13e need not be probe balls but can, for example, be cylinders or tips. Furthermore, the probe head need not perforce be a measuring probe head whose probe pin can be deflected in three coordinate directions relative to the probe head. It can, for example, also be a switching probe head via which a signal is generated with a contact of the probe pin on the workpiece and leads to a read-out of the measuring scale values. The probe pin need also not be exchangeable on the probe head. In the invention, a single probe pin, which cannot be exchanged and has several different probe shafts, can be fixed, for example, with a screw on the probe head 5.

The subject matter of PCT/EP02/02386, filed Mar. 5, 2002, on which the benefit of 35 U.S.C. 120 is claimed herein, and the subject matter of German patent application 101 11 540.7, filed Mar. 10, 2001, on which the claim of priority is based herein, are both incorporated by reference.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for measuring a workpiece, said coordinate measuring apparatus defining coordinate directions (x, y, z) and comprising:
   a probe head movable in said coordinate directions (x, y, z);
   a probe pin or probe pins which can be attached to said probe head;
   said probe pin or said probe pins having a plurality of shafts having respective ends;
   a plurality of contact bodies attached to corresponding ones of said ends of said shafts;

at least two of said shafts of one of said probe pins having different orientations when said probe pin is attached to said probe head;

a control and evaluation unit for controlling the measuring sequence and for evaluating the recorded measuring points;

said control and evaluation unit functioning to carry out a method including the steps of:

determining at least one characteristic directional datum ($\vec{n}_{Ai}$ or $\vec{n}_{Ii}$) for the points, which are to be measured, of a geometric element on said workpiece either from measured measuring points ($P_1$ to $P_4$) or from predefined desired data of said geometric element; and, determining one or several probe shafts of the one or several of the measuring points of the geometric element which are suitable from said directional datum ($\vec{n}_{Ai}$ or $\vec{n}_{Ii}$).

2. The coordinate measuring apparatus of claim 1, wherein said control and evaluation unit determines said directional datum ($\vec{n}_{Ai}$ or $\vec{n}_{Ii}$) as at least one vector ($\vec{n}_{Ai}$ or $\vec{n}_{Ii}$) for said geometric element.

3. The coordinate measuring apparatus of claim 2, wherein said control and evaluation unit assigns a vector ($\vec{s}_j$) to each of said probe shafts; and, said vector ($\vec{s}_j$) points in the longitudinal direction of said probe shaft.

4. The coordinate measuring apparatus of claim 1, wherein said control and evaluation unit determines a probe shaft as suitable; and, said probe shaft has a longitudinal direction and said longitudinal direction of said probe shaft and said directional datum ($\vec{n}_{Ai}$ or $\vec{n}_{Ii}$) of said geometric element conjointly define an angle ($\beta_{ij}$).

5. The coordinate measuring apparatus of claim 4, wherein said control and evaluation apparatus considers said angle ($\beta_{ij}$) as lying within a predefined angular region ($\beta_{ij} \pm \epsilon$).

6. The coordinate measuring apparatus of claim 2, wherein said control and evaluation unit uses the surface normal at at least one point of said geometric element as said one vector ($\vec{n}_{Ai}$) of said geometric element for outer elements.

7. The coordinate measuring apparatus of claim 2, wherein said control and evaluation unit uses a vector, which points in the direction of the primary axis ($a_z$) of said geometric element, as said one vector ($\vec{n}_{Ii}$) of said geometric element for inner elements.

8. The coordinate measuring apparatus of claim 5, wherein said control and evaluation unit determines said directional datum ($\vec{n}_{Ai}$ or $\vec{n}_{Ii}$) as at least one vector ($\vec{n}_{Ai}$ or $\vec{n}_{Ii}$) for said geometric element; said control and evaluation unit assigns a vector ($\vec{s}_j$) to each of said probe shafts; said vector ($\vec{s}_j$) points in the longitudinal direction of said probe shaft; and, said control and evaluation unit defines said angle ($\beta_{ij}$) between the vector ($\vec{n}_{Ai}$ or $\vec{n}_{Ii}$) of said geometric element and the vector ($\vec{s}_j$) of said probe shaft as $180° \pm \epsilon$ or $0° \pm \epsilon$ where $\epsilon$ can assume a value between 0° and 90°.

9. The coordinate measuring apparatus of claim 1, wherein said control and evaluation unit, when scanning said geometric element with a probe shaft determined as not suitable, converts the measuring points, which were scanned with said probe shaft determined as unsuitable, to the probe shaft determined as suitable.

10. The coordinate measuring apparatus of claim 9, wherein said control and evaluation unit measures said geometric element with said probe shaft determined as suitable.

11. The coordinate measuring apparatus of claim 9, wherein said control and evaluation unit outputs a fault announcement for the case where no suitable probe shaft is found.

12. A method for measuring a workpiece on a coordinate measuring apparatus defining coordinate directions (x, y, z), the coordinate measuring apparatus includes: a probe head movable in said coordinate directions (x, y, z); a probe pin or probe pins which can be attached to said probe head; said probe pin or said probe pins having a plurality of shafts having respective ends; a plurality of contact bodies attached to corresponding ones of said ends of said shafts; and, at least two of said shafts of one of said probe pins having different orientations when said probe pin is attached to said probe head; the method comprising the steps of:

determining at least one characteristic directional datum ($\vec{n}_{Ai}$ or $\vec{n}_{Ii}$) for the points, which are to be measured, of a geometric element on said workpiece either from measured measuring points ($P_1$ to $P_4$) or from predefined desired data of said geometric element; and, determining one or several probe shafts of the one or several of the measuring points of the geometric element which are suitable from said directional datum ($\vec{n}_{Ai}$ or $\vec{n}_{Ii}$).

13. The method of claim 12, wherein said directional datum ($\vec{n}_{Ai}$ or $\vec{n}_{Ii}$) is determined as a vector ($\vec{n}_{Ai}$ or $\vec{n}_{Ii}$) for said geometric element as directional datum.

14. The method of claim 13, wherein a vector ($\vec{s}_j$) is assigned to each of said probe shafts; and, said vector ($\vec{s}_j$) points in the longitudinal direction of said probe shaft.

15. The method of claim 12, wherein a probe shaft is determined as suitable; and, said probe shaft has a longitudinal direction and said longitudinal direction of said probe shaft and the directional datum ($\vec{n}_{Ai}$ or $\vec{n}_{Ii}$) of said geometric element conjointly define an angle ($\beta_{ij}$).

16. The method of claim 15, wherein said angle ($\beta_{ij}$) lies within a predefined angular region ($\beta_{ij} \pm \epsilon$).

17. The method of claim 16, wherein said directional datum ($\vec{n}_{Ai}$ or $\vec{n}_{Ii}$) is determined as a vector ($\vec{n}_{Ai}$ or $\vec{n}_{Ii}$) for said geometric element as directional datum; a vector ($\vec{s}_j$) is assigned to each of said probe shafts; said vector ($\vec{s}_j$) points in the longitudinal direction of said probe shaft; and, said angle ($\beta_{ij}$) between said directional datum ($\vec{n}_{Ai}$ or $\vec{n}_{Ii}$) of said geometric element and the vector ($\vec{s}_j$) of said probe shaft is $180° \pm \epsilon$ or $0° \pm \epsilon$ where $\epsilon$ can assume a value between 0° and 90°.

18. The method of claim 13, wherein said one vector ($\vec{n}_{Ai}$) of said geometric element, for outer elements, is the surface normal of said geometric element in at least one point of said geometric element.

19. The method of claim 13, wherein said one vector ($\vec{n}_{Ii}$) of said geometric element, for inner elements, is in the direction of the primary axis of said geometric element.

20. The method of claim 12, wherein, when scanning said geometric element with a probe shaft determined as not suitable, the measuring points, which were scanned with said probe shaft determined as unsuitable, are converted to the probe shaft determined as suitable.

21. The method of claim 12, wherein said geometric element is measured with said probe shaft determined as suitable.

22. The method of claim 12, wherein a fault announcement is outputted for the case where no suitable probe shaft is found.

* * * * *

UNITED STATES PATENT AND TRADEMARK OFFICE
CERTIFICATE OF CORRECTION

| | |
|---|---|
| PATENT NO. | : 7,024,333 B2 |
| APPLICATION NO. | : 10/658382 |
| DATED | : April 4, 2006 |
| INVENTOR(S) | : Rudolf Rogele et al. |

It is certified that error appears in the above-identified patent and that said Letters Patent is hereby corrected as shown below:

In the title page:
Under Item (56), References Cited, OTHER PUBLICATIONS, line 2: delete "Atastpunkten" and substitute -- Abtastpunkten -- therefor.

In column 1:
Line 62: add -- be -- before "scanned".

In column 5:
Line 16: delete "3." and substitute -- 1 -- therefor.

In column 7:
Line 50: delete " $|\vec{n}_i|=1$ " and substitute -- $|\vec{n}_i|=1)$ -- therefor.

In column 10:
Line 29: delete "portable" and substitute -- portal -- therefor.

Signed and Sealed this

Seventeenth Day of October, 2006

JON W. DUDAS
*Director of the United States Patent and Trademark Office*